United States Patent [19]

Oshima et al.

[11] 4,383,890

[45] May 17, 1983

[54] CERAMIC SHEET AND METHOD FOR PRODUCING THE SAME

[75] Inventors: Masayuki Oshima, Shinagawa; Yasuhiko Matsui, Kure, both of Japan

[73] Assignees: Nittetsu Mining Co., Ltd.; Toyo Pulp Co., Ltd., both of Tokyo, Japan

[21] Appl. No.: 239,480

[22] Filed: Mar. 2, 1981

[30] Foreign Application Priority Data

Mar. 18, 1980 [JP] Japan ................................. 55-33420

[51] Int. Cl.³ .............................................. D21H 5/12
[52] U.S. Cl. ............................. 162/157.6; 162/181.1; 162/181.8; 162/207
[58] Field of Search ................. 162/181.1, 181.8, 177, 162/157 C, 145, 146, 181.6, 207; 264/59, 63

[56] References Cited

U.S. PATENT DOCUMENTS 3,472,840 10/1969 Stone et al. ........................ 162/177
3,998,690 12/1976 Lyness et al. ...................... 162/145
4,210,490 7/1980 Taylor ............................. 162/181.8
4,244,781 1/1981 Heckman ........................... 162/145

FOREIGN PATENT DOCUMENTS 619559 5/1961 Canada ............................ 162/169
50-35408 4/1975 Japan ............................ 162/157 C
511405 8/1976 U.S.S.R. ......................... 162/157 C

*Primary Examiner*—Peter Chin
*Attorney, Agent, or Firm*—Wenderoth, Lind & Ponack

[57] ABSTRACT

A ceramic sheet comprising 5 to 50 wt. % (absolute dry weight) of a cation-modified pulp having a degree of substitution of cationic group of 0.02 to 0.04 and beaten to freeness of 200 to 100 ml C.S.F. and 50 to 95 wt. % of fine inorganic particles dispersed uniformly in and supported by said cation-modified pulp. This ceramic sheet can be easily prepared from an aqueous suspension of the cation-modified pulp and the fine inorganic particles by using a paper-making treatment.

11 Claims, 2 Drawing Figures

CERAMIC SHEET AND METHOD FOR PRODUCING THE SAME

BACKGROUND OF THE INVENTION

This invention relates to a ceramic sheet formed by subjecting inorganic fine particles to a sheet-making treatment. More particularly, the present invention relates to a ceramic sheet formed by fixing fine inorganic particles to cellulose pulp and also to a method for producing the same.

Various methods have heretofore been proposed in order to produce a ceramic sheet from a mixed suspension of various fine inorganic particles and cellulose pulp by using a conventional paper-making process. Among them, there are a method which adds an inorganic flocculant, such as alumina sulfate, or an organic high-molecular flocculant, such as polyethyleneimine or cationmodified starch, to the suspension to convert the fine inorganic particles into macro-particles and thus to fix them to the cellulose pulp, and a method which adds a surfactant to the cellulose pulp so as to uniformly disperse the fine inorganic particles and to fix them onto the cellulose pulp. In accordance with these methods, however, when large quantities such as 50 wt.% or more of the fine inorganic particles on the dry basis weight of the sheet are to be contained in the ceramic sheet, the proportion of the inorganic particles not coming into contact with the cellulose pulp becomes greater so that the fine inorganic particles are likely to peel off from the sheet after sheet making. Furthermore, if the amount of the flocculant or the surfactant is increased in order to increase the fixing ratio of the inorganic particles to the cellulose pulp, flocks of the inorganic particles are formed so that the distribution of the inorganic particles in the sheet becomes non-uniform and, at the same time, a sheet as thin as 0.5 mm or below becomes difficult to be produced.

Possible applications of this kind of ceramic sheet include a flame retardant material, an electrical insulating material and a heat insulating material in the form of the ceramic sheet as it is, and a sintered ceramic sheet after the ceramic sheet is sintered. In producing the sintered body by sintering the ceramic sheet, cellulose pulp in the sheet is burnt out and sinterable inorganic particles are sintered into a firm, sintered ceramic sheet. The conventional ceramic sheet, however, undergoes remarkable firing shrinkage in a wide temperature range from burning of the cellulose pulp before sintering of the inorganic particles so that the sintered sheet is not free from occurrence of cracks and is likely to be broken.

SUMMARY OF THE INVENTION

It is therefore an object of the present invention to provide a ceramic sheet having a high fixing ratio of fine inorganic particles.

It is another object of the present invention to provide a ceramic sheet in which large quantities of fine inorganic particles are uniformly dispersed in and fixed to the cellulose pulp.

It is still another object of the present invention to provide a ceramic sheet which makes it possible to fix fine inorganic particles in such large quantities as from 50 to 95 wt.% on the dry basis weight of the sheet and yet to reduce the thickness of the sheet.

It is still another object of the present invention to provide a ceramic sheet which is suited for producing a strong, thin sintered ceramic sheet by sintering the ceramic sheet.

It is further an object of the present invention to provide a method for producing the above mentioned ceramic sheet.

Briefly stated, the ceramic sheet in accordance with the present invention comprises 5 to 50 wt.%, in terms of the dry basis weight, of cation-modified pulp beaten to a freeness of 200 to 100 ml C.S.F. (Canadian Standard Freeness) and having a degree of substitution of cationic group of 0.02 to 0.04, and 50 to 95 wt.% of fine inorganic particles uniformly dispersed in and fixed to the cation-modified pulp.

The term "cation-modified pulp" herein used denotes cellulose pulp that is positively charged by introducing a cationic group into the pulp.

The term "degree of substitution of cationic group" used herein denotes a degree of cation modification of the cellulose pulp and is defined by the number of an OH group or OH groups substituted by the cationic group or groups, among three OH groups which a glucose unit in cellulose has.

The above-mentioned ceramic sheet in accordance with the present invention can be easily produced on an industrial scale by employing a conventional paper-making technique that has been used widely. Namely, cellulose pulp is first cation-modified mildly in such a manner that the degree of substitution of cationic group is from 0.02 to 0.04. The cellulose pulp is then beaten to a freeness of 200 to 100 ml C.S.F. The cation-modified pulp thus obtained is mixed with fine inorganic particles in the presence of water to form an aqueous suspension, and a sheet is produced from this suspension by an ordinary paper-making process.

The present invention will become more apparent from the following description to be taken in conjunction with the accompanying drawings.

DESCRIPTION OF THE PREFERRED EMBODIMENTS

Figure 1:
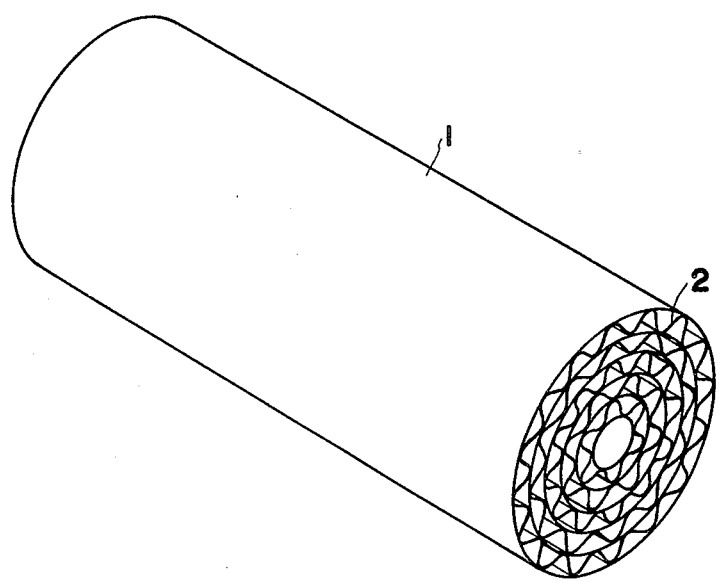
FIG. 1 is a perspective view of a sintered ceramic structure obtained by sintering ceramic sheet of the present invention.

The inventors of the present invention have made intensive studies of various methods of producing ceramic sheet by fixing fine inorganic particles onto cellulose pulp and shaping them into a sheet, and have found the following facts;

(1) that adsorption of the fine inorganic particles onto the surface of the cellulose pulp is generally accomplished by the synergistic effects of electrostatic adsorption due to the colloidal properties of the particles in the aqueous medium and physical adsorption due to the increase in the surface area of the cellulose fibers;

(2) that, in order to enhance the above-mentioned electrostatic adsorption effect, it is necessary to modify cationically the cellulose pulp, but if the degree of cation modification is too excessive in this instance, the pulp itself would be damaged excessively or become pasty to eventually hinder the sheet-making operation and to make it difficult to carry out the beating treatment of the pulp; hence, the cation modification is preferably mild; and (3) that, in order to enhance the physical adsorption effect, the cellulose pulp must be subjected to the beating treatment to increase the specific surface area of the fibers and to promote their mechanical entanglement.

On the basis of the above-described findings, the inventors of the invention have furthered the studies and have found that, as the cellulose pulp for fixing uniformly large quantities of the fine inorganic particles, it is suitable to use a cellulose pulp that is cation-modified to a degree of substitution of cationic group of 0.02 to 0.04 and is then beaten to a freeness of 200 to 100 ml C.S.F. Thus, the present invention is based on these findings.

In the present invention, the degree of cation-modification of the cellulose pulp must fall within a relatively low range of a degree of substitution of cationic group of 0.02 to 0.04. If the degree of substitution exceeds 0.04, the hydrophilic property of the cellulose becomes so great that the cellulose is likely to become pasty, which is not only undersirable for the subsequent beating treatment but also for the sheet-making operation. If the degree of substitution is below 0.02, on the other hand, fixability of the fine inorganic particles to the cellulose would be drastically reduced.

The cation-modified pulp to be used in the present invention can be produced by introducing into a cellulose such a cationic group as can be derived from amine compounds, for example. Although there are various methods of producing the cation-modified pulp, one of the easiest and most economical methods comprises mixing cellulose pulp in an aqueous alkaline solution of an amine compound, such as, for example, diethylaminoethyl chloride, ethanolamine, 2,3-aminoethylsulfuric acid or cyanamide, to form a suspension, and then allowing them to react for a predetermined period of time to introduce the cationic group into the cellulose. The ratio of the amine compound to be used relative to the cellulose pulp varies with the concentration of the amine compound in the suspension, the reaction time, the pH, the reaction temperature, and so forth. Generally, however, the greater the ratio of the amine compound to the cellulose pulp and the longer the reaction time, the higher the degree of substitution of the cationic group. Though a higher degree of substitution could be obtained if the reaction temperature is lower, the reaction time becomes longer in such a case.

Though the cellulose pulp as it is can be used as the pulp to be cation-modified, pretreatment with an aqueous alkaline solution or pretreatment by mechanical beating may be employed in order to facilitate the cation-modification reaction. Since the functional group participating in the modification reaction is believed to be an OH group, fibrous substances in any form that are generally employed in the ordinary pulp and paper industry or in other industries may be used as the cellulose pulp to be cation-modified, regardless of their forms.

The following is an example of the experimental result illustrating the relation between the concentration of the amine compound in the suspension and the degree of substitution of the cationic group;

| Conc. of an aqueous solution of an amine compound | Degree of substitution of cationic group |
| --- | --- |
| 15% | 0.05 |
| 7% | 0.03 |
| 2% | 0.01 |

The above-mentioned result is obtained when diethylaminoethyl chloride is used as the amine compound under the reaction condition of the pulp concentration of 20% in the suspension, the reaction temperature of 20° C. and the reaction time of 10 hours.

The cation-modified pulp thus obtained may be used after being converted into a more stable acid addition salt, if necessary. The acid addition salt can be obtained easily by treating the cation-modified pulp on the acidic side of pH 2 to 5 using an inorganic acid such as sulfuric acid, hydrochloric acid or nitric acid, or an organic acid such as formic acid, acetic acid or oxalic acid.

The cation-modified pulp obtained in this manner is then beaten by a conventional mechanical treatment such as a treatment using a beater or a disc refiner. The degree of freeness is in a relatively high range of from 200 to 100 ml C.S.F. Since the cation modification of the cellulose pulp is restricted to a relatively mild degree as described above, the pulp fibers can be beaten effectively without mechanical collapse even by such a high beating treatment. If beating is effected in such a range of freeness, it is possible to furnish the pulp fibers with the physical adsorbing action suited for fixing large quantities of fine inorganic particles onto the pulp fibers.

As the fine inorganic particles to be fixed onto the cation-modified pulp in the present invention, various kinds of natural and synthetic inorganic substances may be selected suitably in accordance with the application of the resulting ceramic sheet. The inorganic substances are exempliefied as follows.

Natural inorganic substances:
siliceous stone, siliceous sand, diatomaceous earth, clay, kaolin, kaolinite, bauxite, sericite, bentonite, zeolite, apatite, acid earth, pottery stone, pyrophyllite, feldspar, lime stone, wollastonite, gypsum, dolomite, magnesite, talc, and asbestos; and Synthetic inorganic substances:
metal hydroxides (e.g. aluminum hydroxide, ferric hydroxide, etc.), calcium silicate hydrates (e.g. tobermorite, xonotlite, etc.), hydrates of oxide (e.g. calcium aluminate hydrate, calcium sulfonate hydrate, etc.), alumina, magnesia, zirconia, titanium oxide, spinel, synthetic cordierite, synthetic mullite, synthetic zeolite, synthetic clacium carbonate, calcium phosphate, carbides (e.g. TiC, ZrC, HfC, VC, TaC, NbC, WC, $B_4C$, SiC, etc.), nitrides (e.g. TiN, VN, NbN, TaN, HfN, AlN, BN, $Si_3N_4$, etc.), active carbon, graphite, ferrous oxide, ferric oxide, lead oxide, zinc oxide, nickel oxide, manganese dioxide, cupric oxide, cobalt oxide, barium carbonate, manganese carbonate, various inorganic pigments, glass powder (ceramic frit, etc.), and glass fibers.

It is possible to use one of these inorganic substances alone or two or more in mixture. These substances are used in the form of fine particles of a particle size that does not precipitate in the suspension, for example, up to $50\mu$.

It is possible to fix the fine inorganic particles onto the cation-modified pulp that has already beaten and then to form a sheet, by mixing them together in a desired ratio in the presence of water to form an aqueous suspension and converting the suspension into the sheet by a conventional paper-making process. The mixing ratio of the cation-modified pulp and the fine inorganic particles is from 5 to 50 wt.% (absolute dry weight) for the former and from 50 to 95 wt.% for the latter and is suitably selected within this range in accordance with the application of the resulting ceramic sheet. If the ratio of the cation-modified pulp is below 5 wt.%, it is not possible to obtain sufficient entanglement of the fibers that allows the fibers to fix and hold large quantities of the fine inorganic particles. If the mixing ratio of the fine inorganic particles is below 50 wt.%, on the other hand, it is not possible, either, to furnish the resulting product with sufficient properties as the ceramic sheet.

In accordance with the ceramic sheet obtained in this manner, the degree of cation modification of the cellulose pulp may as well be mild so that the physical properties of the cellulose pulp are not much changed by this cation modification treatment. Furthermore, during the sheet-making step, the cation-modified pulp can be treated in substantially the same way as the cellulose pulp that is not cation-modified. As described above, since the cation-modified pulp can be beaten to a high degree of beating, it is possible to enhance the fixing ratio of the fine inorganic particles to the cellulose pulp and hence, to obtain a ceramic sheet in which the fine inorganic particles are uniformly dispersed and fixed in a high density. The resulting ceramic sheet is thin and has high strength so that it can be easily fabricated.

The ceramic sheet in accordance with the present invention can be used by itself as a flame retardant material or an insulating material, but it can also be used as a thin, sintered ceramic sheet after being sintered. The term "sinter" herein used denotes that the ceramic sheet is heated in such a manner that the cellulose pulp is burnt out and the fine inorganic particles are partially fused and vitrified.

In order to sinter the ceramic sheet, it is necessary that at least one sinterable substance be contained in the inorganic substances that are to be fixed to the cellulose pulp. The inventors of the present invention have found that when clayish materials are used as the sinterable inorganic substance, there can be obtained a ceramic sheet suitable for obtaining a strong, thin sintered body by sintering the ceramic sheet. In other words, when at least one clayish substance is contained and mixed in the fine inorganic particles to be fixed to the cellulose pulp, the fine inorganic particles can be strongly fixed to and supported by the cellulose pulp at a high fixing ratio due to adhesion and plasticity of the clayish substance in addition to the entanglement of the pulp fibers. During sintering of such a ceramic sheet, the clayish substance reduces the firing shrinkage of the sheet due to sintering in cooperation with the other inorganic particles. After the pulp is burned out, further, adhesive bonding power of the clayish substance supports the other fine inorganic particles as a whole so that occurrence of cracks and breaks of the sheet can be prevented. Thus, there can be obtained a thin sintered body having high strength.

As the clayish substance, the present invention uses clays in general that are ordinarily used as a plasticizer and a tackifier in the ceramic industry. Examples of the clayish substance include clay (e.g. Kibushi clay, Gairome clay, etc.), kaolin, pyrophyllite, montmorillonite, bentonite, clayish mica, and so forth.

The amount of addition of the clayish substance is from about 5wt.% to about 50wt.% on the basis of the total of the fine inorganic particles. If the amount is below 5wt.%, its effect as the tackifier can not be obtained sufficiently whereas when it exceeds 50wt.%, firing shrinkage and warp of the resulting ceramic sheet become too great and cracks and the like are likely to occur.

The ceramic sheet containing the clayish substance has high workability and can be shaped into various structures. Namely, since the fine inorganic particles are firmly fixed by means of the entanglement of the pulp fibers as well as by means of the adhesion and plasticity of the clayish substance, peeling and cracks of the fine inorganic particles do not occur even when the sheet is cut or bent. When plural ceramic sheets are mutually bonded by an adhesive, the pulp portions in the sheet is not significantly swelled by the adhesive because of the relatively small content of cellulosic pulp in the sheet and because of the uniform dispersion of pulp in the sheet, so that peeling of the bonded portions is not induced. Accordingly, the resulting sheet can be shaped into a complicated structure such as, for example, honeycomb structure. When such a complicated structure is sintered, there is obtained a sintered ceramic structure having a complicated shape. By sintering various structures consisting of the ceramic sheet of the present invention, useful industrial structures such as heat exchangers, catalyst supports, radiators and the like can be obtained. If a papercraft product is produced using the ceramic sheet of the present invention and is then sintered, there can be obtained a sintered article having the shape of the papercraft product itself.

In sintering the ceramic sheet of the present invention and the structures obtained by shaping the ceramic sheet into various forms, the sheet or the structures are first heated to a temperature of about 200° to 600° C., for example, at which the cellulose pulp in the sheet is carbonized but not ignited and is evaporated as a gas. Next, the sheet is gradually heated to a sintering temperature of the fine inorganic particles, the sintering temperature varying with the kind of the fine inorganic particles used.

Though the present invention will be described in further detail with reference to examples thereof, the examples are merely illustrative but not restrictive in any manner.

EXAMPLE 1

As aqueous solution was first prepared by dissolving 50 Kg of calcium cyanamide in 2.5 m$^3$ of water and then filtering insoluble residues. To this aqueous solution was added 50 Kg of N-BKP (bleached craft pulp of a coniferous tree) thereby to form a suspension, and the resulting suspension was stirred for 10 minutes and was reacted at room temperature and normal pressure for 40 hours. The pH of the suspension was 12.5. The pulp was separated from the suspension after the reaction, was washed with water, and was then immersed in water. The pH was adjusted to 5 with 20% aqueous hydrochloric acid solution and the solution was held at that pH for 1 hour. Thereafter, the pulp was separated and was washed with water, thereby yielding a stable acid addition salt of cation-modified pulp. The degree of substitution of the cationic group of the resulting pulp was 0.03.

After the above-mentioned cation-modified pulp was beaten to 130 ml C.S.F. by a beater and 2.5 g (absolute dry weight) of the pulp thus beaten was added to 22 g of fine inorganic particles (500 mesh pass) in the form of suspension prepared in advance by suspending 40 parts by weight of silica, 20 parts by weight of alumina, 15 parts by weight of feldspar and 25 parts by weight of Gairome clay in water, followed by stirring to form a suspension. The ceramic sheet of a basis weight of 275 g/m² was manually produced from this suspension.

For comparison, ceramic sheets were also produced using a beaten pulp (medium beaten pulp) obtained by beating the above-mentioned cation-modified pulp to 450 ml C.S.F. and unbeaten pulp (650 ml C.S.F.) respectively, in accordance with the same procedures under the same conditions as above.

A sheet tip was cut out from each of the three kinds of sheets, was then placed in a crucible and was burnt at 900° C. in an electric furnace to measure the ash weight. The ash content with respect to the dry basis weight was 81.7 wt.% for the beaten pulp of 130 ml C.S.F., 58.8 wt.% for the beaten pulp of 450 ml C.S.F. and 46.8 wt.% for the unbeaten pulp.

EXAMPLE 2

20 Kg (absolute dry weight) of the cation-modified pulp produced in Example 1 was beaten to 170 ml C.S.F. by a disc refiner and thereto was added 90 Kg of aluminum hydroxide powder that was suspended in water in advance. The mixture was stirred to form a suspension. Using a cylinder machine, a ceramic sheet having a basis weight of 214.6 g/m² as a three-layered sheet was produced from the suspension.

Part of the resulting sheet was cut out, was placed in a crucible, and was heated to 900° C. in an electric furnace to measure the ash weight. The ash content with respect to the dry basis weight was 46.2 wt.%.

EXAMPLE 3

A cation-modified pulp having a degree of substitution of cationic group of 0.035 was obtained by subjecting unbeaten cotton linter pulp in the same way as in Example 1. 20 Kg (absolute dry weight) of this pulp was beaten to 120 ml C.S.F. by a disc refiner, and thereto was added 90 Kg of zeolite powder (500 mesh pass) suspended in advance in water, and was mixed to form a suspension. Using a cylinder machine, a ceramic sheet having a basis weight of 250.5 g/m² as a three-layered sheet was produced from the suspension. In this instance, white water was not at all recovered.

Part of this sheet was cut out, was then placed in a curcible and was heated to 900° C. for 1 hour in an electric furnace to measure the ash weight. The ash content with respect to the dry basis weight was 83.2 wt.%.

EXAMPLE 4

A cation-modified pulp having a degree of substitution of cationic group of 0.035 was beaten to 120 ml C.S.F. To 10 parts by weight (absolute dry weight) of N-BKP thus obtained was added 90 parts be weight of a ceramic raw material consisting of 50 parts by weight of clay, 30 parts by weight of fine siliceous stone and 20 parts by weight of fine feldspar powder. Water was added to the mixture to form a suspension, from which a sheet was produced by a conventional paper-making method. After dried, the sheet was roll-pressed to yield a ceramic sheet of the present invention having a sheet density of 1.55 g/cm³.

For comparison, a ceramic sheet was produced in accordance with a prior art method. Namely, 90 parts by weight of the above-mentioned ceramic raw material was mixed with 10 parts by weight (absolute dry weight) of the N-BKP, that was not cation-modified, and water was added to the mixture to form a suspension. Aluminum sulfate was added to adjust the pH of the suspension to 4.5, and the ceramic sheet having a sheet density of 1.11 g/cm³ was produced by the same paper-making method as above.

20 sheets of square test samples (100 mm × 100 mm) were produced from these two kinds of ceramic sheets and were sintered to 1,000° C. in an electric furnace to measure the weight after sintering and thus to determine the sintering weight reduction ratio. The results were illustrated in Table 1. These samples were held at 1,300° C. for 1 hour in the electric furnace to measure the shrinkage ratio of the sintered products. The results were illustrated in Table 2. Whereas the ceramic sheets in accordance with the present invention exhibited uniform shrinkage by sintering, maintained the original shape of the test samples and were flat, the ceramic sheets in accordance with the prior art method exhibited irregular shrinkage so that the opposite sides of the square test sample were not parallel and the test samples were minutely corrugated as a whole and had numerous small cracks.

TABLE 1

| Sintering reduction ratio (%) | | | | | | | |
|---|---|---|---|---|---|---|---|
| Ceramic sheet of the invention | | | | Ceramic sheet of the prior art | | | |
| Sample No. | Data | Sample No. | Data | Sample No. | Data | Sample No. | Data |
| 1 | 17.62 | 11 | 17.54 | 1 | 49.84 | 11 | 49.67 |
| 2 | 17.14 | 12 | 17.01 | 2 | 48.54 | 12 | 50.02 |
| 3 | 17.97 | 13 | 17.31 | 3 | 50.35 | 13 | 51.57 |
| 4 | 17.42 | 14 | 17.88 | 4 | 47.46 | 14 | 47.68 |
| 5 | 17.78 | 15 | 17.24 | 5 | 50.71 | 15 | 48.37 |
| 6 | 17.13 | 16 | 17.93 | 6 | 45.68 | 16 | 49.58 |
| 7 | 17.25 | 17 | 17.15 | 7 | 49.08 | 17 | 50.17 |
| 8 | 16.89 | 18 | 17.33 | 8 | 49.89 | 18 | 51.04 |
| 9 | 17.46 | 19 | 17.49 | 9 | 52.75 | 19 | 47.71 |
| 10 | 17.41 | 20 | 17.09 | 10 | 46.84 | 20 | 47.92 |
| No. of data: $n = 20$ | | | | No. of data: $n = 20$ | | | |
| Mean value: $\overline{X} = 17.402$ | | | | Mean value: $\overline{X} = 49.244$ | | | |
| Standard deviation: $\sigma = 0.311$ | | | | Standard deviation: $\sigma = 17.22$ | | | |

TABLE 2

| Firing shrinkage ratio (%) | | | | | | | |
|---|---|---|---|---|---|---|---|
| Ceramic sheet of the invention | | | | Ceramic sheet of the prior art | | | |
| Dimension before sintering (mm) | | | | | | | |
| 100 m/m | | | | 100 m/m | | | |
| Sample No. | Data | Sample No. | Data | Sample No. | Data | Sample No. | Data |
| Dimension of sintered product (mm) | | | | | | | |
| 1 | 89.77 | 11 | 90.19 | 1 | 62.04 | 11 | 63.48 |
| 2 | 89.87 | 12 | 89.70 | 2 | 66.15 | 12 | 65.58 |
| 3 | 89.69 | 13 | 89.95 | 3 | 65.19 | 13 | 65.35 |
| 4 | 89.92 | 14 | 89.60 | 4 | 63.83 | 14 | 63.49 |
| 5 | 90.01 | 15 | 89.86 | 5 | 64.71 | 15 | 66.03 |
| 6 | 89.45 | 16 | 89.74 | 6 | 63.09 | 16 | 64.01 |
| 7 | 89.62 | 17 | 89.88 | 7 | 64.78 | 17 | 64.85 |
| 8 | 89.75 | 18 | 89.79 | 8 | 64.09 | 18 | 64.54 |
| 9 | 89.99 | 19 | 89.64 | 9 | 62.89 | 19 | 63.97 |
| 10 | 89.85 | 20 | 89.79 | 10 | 65.47 | 20 | 64.47 |

TABLE 2-continued

| Firing shrinkage ratio (%) | | | |
|---|---|---|---|
| No. of data: | n = 20 | No. of data: | n = 20 |
| Mean value: | X = 89.803 | Mean value: | X = 64.501 |
| Standard deviation: | σ = 0.168 | Standard deviation: | σ = 0.935 |

| Firing shrinkage ratio (%) | |
|---|---|
| 10.197 | 35.499 |

EXAMPLE 5

The cation-modified pulp produced in Example 1 was beaten to 130 ml C.S.F. and 2.5 Kg (absolute dry weight) of the pulp was added to 22 Kg of a mixture consisting of 60 parts be weight of a mixture of fine powder of siliceous sand, alumina and cordierite and 40 parts by weight of clay suspended in advance in water. Using a cylinder machine, a ceramic sheet was produced from this suspension. The ceramic sheet so obtained had a basis weight of 284 g/m² as a three-layered sheet.

The ceramic sheet was fabricated into a structure having a shape as shown in FIG. 1. This structure was composed of a number of cylinders 1 that had varying diameters from one another and were made of the flat ceramic sheet, and a number of cylinders 2 that had varying diameters from one another and were made of the corrugated ceramic sheet. The cylinders of the corrugated ceramic sheet were sequentially bonded to the cylinders of the flat ceramic sheet. When this structure was sintered at a temperature of 1,250° C., the resulting ceramic structure perfectly retained the original shape and had sufficient strength to withstand practical application.

Incidentally, it is possible to produce a structure similar to the one shown in FIG. 1 by bonding one liner of the flat ceramic sheet and one corrugated sheet of the abovementioned sheet to previously form a one-side corrugated cardboard and then winding this one-side corrugated cardboard in a spiral form.

EXAMPLE 6

20 Kg (absolute dry weight) of the cation-modified pulp produced in Example 1 was beaten by a disc refiner to 170 ml C.S.F. and thereto was added 90 Kg of a mixture consisting of 90 parts by weight of a mixture of fine powder of silica, alumina and feldspar and 10 parts by weight of a mixture of bentonite and Gairome clay. Using a cylinder machine, a ceramic sheet was produced. The ceramic sheet had a basis weight of 276 g/m² as a three-layered sheet.

Figure 2:
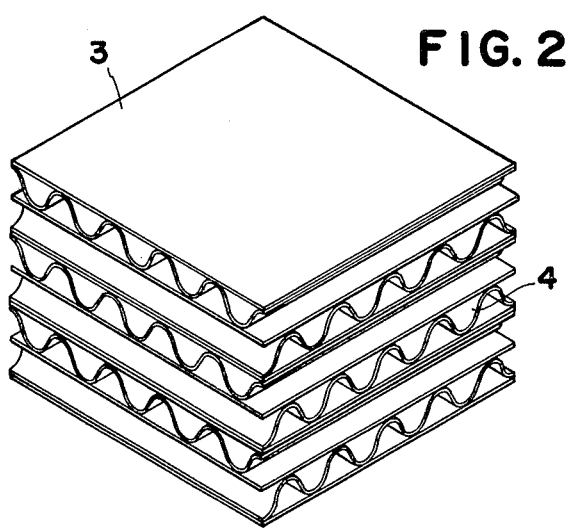
FIG. 2 is a perspective view of another sintered ceramic structure obtained by sintering ceramic sheet of the present invention.

The ceramic sheet was fabricated into a structure having a shape as shown in FIG. 2. This structure was composed of flat sheets 3 of the ceramic sheet and corrugated sheets 4 of the ceramic sheet that were sequentially bonded and laminated to the former. When the structure was sintered at a temperature of 1,230° C., there was obtained a sintered ceramic structure that perfectly retained the original shape and had sufficient strength.

It is understood that the foregoing is only illustrative of some preferred embodiments of the present invention and that numerous other changes and modifications would be obvious to those skilled in the art without departing from the spirit and scope of the invention.

What is claimed is:

1. A method for producing a ceramic sheet comprising the steps of:
   preparing a cation-modified cellulose pulp having a degree of substitution of cationic group of 0.02 to 0.04;
   beating said cation-modified pulp to a freeness of 200 to 100 ml C.S.F;
   mixing said cation-modified pulp thus beaten with fine inorganic particles in the presence of water to form an aqueous suspension, the ratio of said cation-modified pulp being from 5 to 50 wt.% (absolute dry weight) and that of said fine inorganic particles being from 50 to 95 wt.%; and
   forming a ceramic sheet by subjecting said aqueous suspension to a paper-making treatment.

2. The method for producing a ceramic sheet according to claim 1 wherein said fine inorganic particles contain fine particles of at least one sinterable substance.

3. The method for producing a ceramic sheet according to claim 2 wherein said sinterable substance is fine particles of clayish substance.

4. The method for producing a ceramic sheet according to claim 3 wherein the amount of said fine particles of said clayish substance to be added is from 5 to 50 wt.% to the total amount of said fine inorganic particles.

5. A ceramic sheet comprising: 5 to 50 wt.% (absolute dry weight) of a cation-modified cellulose pulp having a degree of substitution of cationic group of 0.02 to 0.04 and beaten to freeness of 200 to 100 ml C.S.F.; and 50 to 95 wt.% of fine inorganic particles dispersed uniformly in and supported by said cation-modified pulp.

6. The ceramic sheet according to claim 5 wherein said fine inorganic particles contain fine particles of at least one sinterable substance.

7. The ceramic sheet according to claim 6 wherein said sinterable substance is fine particles of clayish substance.

8. The ceramic sheet according to claim 7 wherein the amount of said fine particles of said clayish substance is from 5 to 50 wt.% to the total amount of said fine inorganic particles.

9. A method for producing a sintered ceramic structure comprising the steps of:
   preparing a cation-modified cellulose pulp having a degree of substitution of cationic group of 0.02 to 0.04;
   beating said cation-modified pulp to a freeness of 200 to 100 ml C.S.F.;
   mixing said cation-modified pulp thus beaten with fine inorganic particle in the presence of water to form an aqueous suspension, the ratio of said cation-modified pulp being from 5 to 50 wt.% (absolute dry weight) and that of said fine inorganic particles being from 50 to 95 wt.%, said fine inorganic particles containing fine particles of at least one sinterable substance;
   forming a ceramic sheet by subjecting said aqueous suspension to a paper-making treatment;
   shaping the resulting ceramic sheet into a structure having a desired shape; and
   sintering said structure to form the sintered ceramic structure.

10. The method for producing a sintered ceramic structure according to claim 9 wherein said sinterable substance is fine particles of clayish substance.

11. The method for producing a sintered ceramic structure according to claim 10 wherein the amount of said fine particles of said clayish substance is from 5 to 50 wt.% to the total amount of said fine inorganic particles.

* * * * *